US 12,124,562 B2

(12) United States Patent
Jones et al.

(10) Patent No.: US 12,124,562 B2
(45) Date of Patent: *Oct. 22, 2024

(54) LABELED SECURITY FOR CONTROL FLOW INSIDE EXECUTABLE PROGRAM CODE

(71) Applicant: Red Hat, Inc., Raleigh, NC (US)

(72) Inventors: Peter Jones, Cambridge, MA (US); Adam Jackson, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,464

(22) Filed: Feb. 14, 2022

(65) Prior Publication Data
US 2022/0171846 A1    Jun. 2, 2022

Related U.S. Application Data

(63) Continuation of application No. 15/908,263, filed on Feb. 28, 2018, now Pat. No. 11,250,123.

(51) Int. Cl.
*G06F 21/52* (2013.01)
*G06F 21/51* (2013.01)
*G06F 21/54* (2013.01)

(52) U.S. Cl.
CPC .............. *G06F 21/52* (2013.01); *G06F 21/51* (2013.01); *G06F 21/54* (2013.01); *G06F 2221/033* (2013.01)

(58) Field of Classification Search
CPC .......... G06F 21/52; G06F 21/51; G06F 21/54; G06F 2221/033
See application file for complete search history.

(56) References Cited

U.S. PATENT DOCUMENTS 6,128,774 A * 10/2000 Necula ................ G06F 9/44589
717/146
6,539,523 B1 * 3/2003 Narain ................... G06F 30/33
716/106

(Continued)

OTHER PUBLICATIONS

Jun Nakajima et al., "Extending KVM Models Toward High-Performance NFV," Intel Corporation, Oct. 14, 2014, [retrieved Dec. 1, 2014], 28 pages, Internet: < http://www.linux-kvm.org/wiki/images/1/1d/01x05-NFV.pdf>.

(Continued)

*Primary Examiner* — Saleh Najjar
*Assistant Examiner* — Devin E Almeida
(74) *Attorney, Agent, or Firm* — Dority & Manning, P.A.

(57) ABSTRACT

A method includes configuring one or more permissions for a first page of memory including a first section of a plurality of sections of an executable program code to enable execution of the first section. The method also includes configuring one or more permissions for a second page of the memory including a second section of the executable program code to disable execution of the second section. The method also includes identifying one or more annotations in the executable program code, wherein the one or more annotations indicate one or more allowed transitions and one or more disallowed transitions between the plurality of sections. The method also includes changing, in view of the one or more annotations, the one or more permissions of the second page to enable execution of the second section of the executable program code.

19 Claims, 9 Drawing Sheets

(56) References Cited

U.S. PATENT DOCUMENTS

| | | | |
|---|---|---|---|
| 7,337,291 B2 | 2/2008 | Abadi et al. | |
| 7,577,992 B2 | 8/2009 | Abadi et al. | |
| 8,645,923 B1* | 2/2014 | Satish | G06F 21/52 |
| | | | 717/131 |
| 8,656,482 B1 | 2/2014 | Tosa et al. | |
| 9,134,966 B2 | 9/2015 | Brock et al. | |
| 9,250,937 B1* | 2/2016 | Franz | G06F 9/45516 |
| 9,880,842 B2* | 1/2018 | Bobba | G06F 11/076 |
| 9,917,855 B1* | 3/2018 | Li | H04L 63/1408 |
| 9,953,158 B1 | 4/2018 | Benameur et al. | |
| 10,489,592 B1* | 11/2019 | Naamneh | G06F 12/1441 |
| 10,650,147 B2* | 5/2020 | Rombouts | G06F 21/52 |
| 10,685,110 B2* | 6/2020 | Das | G06F 21/566 |
| 2005/0071813 A1* | 3/2005 | Reimer | G06F 11/3604 |
| | | | 717/125 |
| 2008/0184016 A1 | 7/2008 | Erlingsson et al. | |
| 2013/0042238 A1 | 2/2013 | Cardona et al. | |
| 2013/0276057 A1 | 10/2013 | Smith et al. | |
| 2013/0283245 A1 | 10/2013 | Black et al. | |
| 2014/0013326 A1 | 1/2014 | Neiger et al. | |
| 2014/0189690 A1 | 7/2014 | Ramakrishnan Nair | |
| 2014/0245430 A1 | 8/2014 | Vipat et al. | |
| 2014/0281424 A1 | 9/2014 | Bobba et al. | |
| 2014/0283056 A1 | 9/2014 | Bachwani et al. | |
| 2015/0013008 A1 | 1/2015 | Lukacs et al. | |
| 2015/0113640 A1* | 4/2015 | Krten | G06F 21/57 |
| | | | 726/22 |
| 2015/0178497 A1 | 6/2015 | Lukacs et al. | |
| 2015/0294114 A1* | 10/2015 | Monahan | G06F 21/60 |
| | | | 726/26 |
| 2015/0365322 A1 | 12/2015 | Shatzkamer et al. | |
| 2018/0068115 A1* | 3/2018 | Golovkin | G06F 21/566 |

OTHER PUBLICATIONS

David Durham, Mitigating Exploits, Rootkits and Advanced Persistent Threats, Intel Corporation, Hot ChipsTutorial, 2014, [retrieved Dec. 1, 2014], 39 pages, Internet: <http://www.setphaserstostun.org/hc26/HC26-10-tutorial-epub/HC26.10-tutorial1-HW-Security-epub/HC26.10.145-5_HotChipsMitigating_Eploits6.pdf>.

Jun Nakajima, "Intel Update," Xen Summit, Intel Corporation, Aug. 27-28, 2012, [retrieved Dec. 1, 2014]. 4 pages, Internet: <http://www.slideshare.net/xen_com_mgr/intel-update>.

Yasunori Goto, "Kernel-based Virtual Machine Technology," Fujitsu Sci. Tech. J., Jul. 2011, pp. 362-368, vol. 47, No. 3, Internet: <http:/1192.240.0.102/downloads/MAG/vol47-3/paper18.pdf>.

Authur, William P. "Control-Flow Security". Doctoral Dissertation. University of Michigan. 2016. https://web.eecs.umich.edu/~taustin/papers/Arthur_dissertation.pdf. 129 pages.

Coudray, Thomas et al. "Picon: Control Flow Integrity on LLVM IR". Retrieved from https://www.ssi.gouv.fr/uploads/2015/06/SSTIC2015-Article-control_flow_integrity_on_llvm_ir-fontaine_chifflier_coudray_esfrDAI.pdf.on Oct. 10, 2017. 28 pages.

* cited by examiner

LABELED SECURITY FOR CONTROL FLOW INSIDE EXECUTABLE PROGRAM CODE

RELATED CASE

The present application is a continuation of application Ser. No. 15/908,263, filed Feb. 28, 2018, entitled "Labeled Security for Control Flow inside Executable Program Code," which is incorporated by reference herein.

TECHNICAL FIELD

The present disclosure is generally related to system security, and is more specifically related to labeled security for control flow inside executable program code.

BACKGROUND

Certain functions (e.g., audio/video codecs, network packet dumpers, protocol parsing code, etc.) implemented in executable program code may be associated with an increased level of risk for fault due to malicious and/or malformed data. These functions may include code that performs fragile operations such as reading data from an unknown source, among others. Malicious users (e.g., hackers) may identify these fragile operations and target them as entry points into the executable program code to make the executable program code behave in unexpected and/or undesirable ways. For example, the hacker may write an exploit that enters the executable program code using a fragile operation in a certain section of the executable program code and makes that section of the executable program code call into another section of the executable program code (e.g., by writing a return address) that is not expected to be run. An exploit may refer to the use of software, data, or commands to "exploit" a portion of a computer program to carry out some form of malicious intent.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
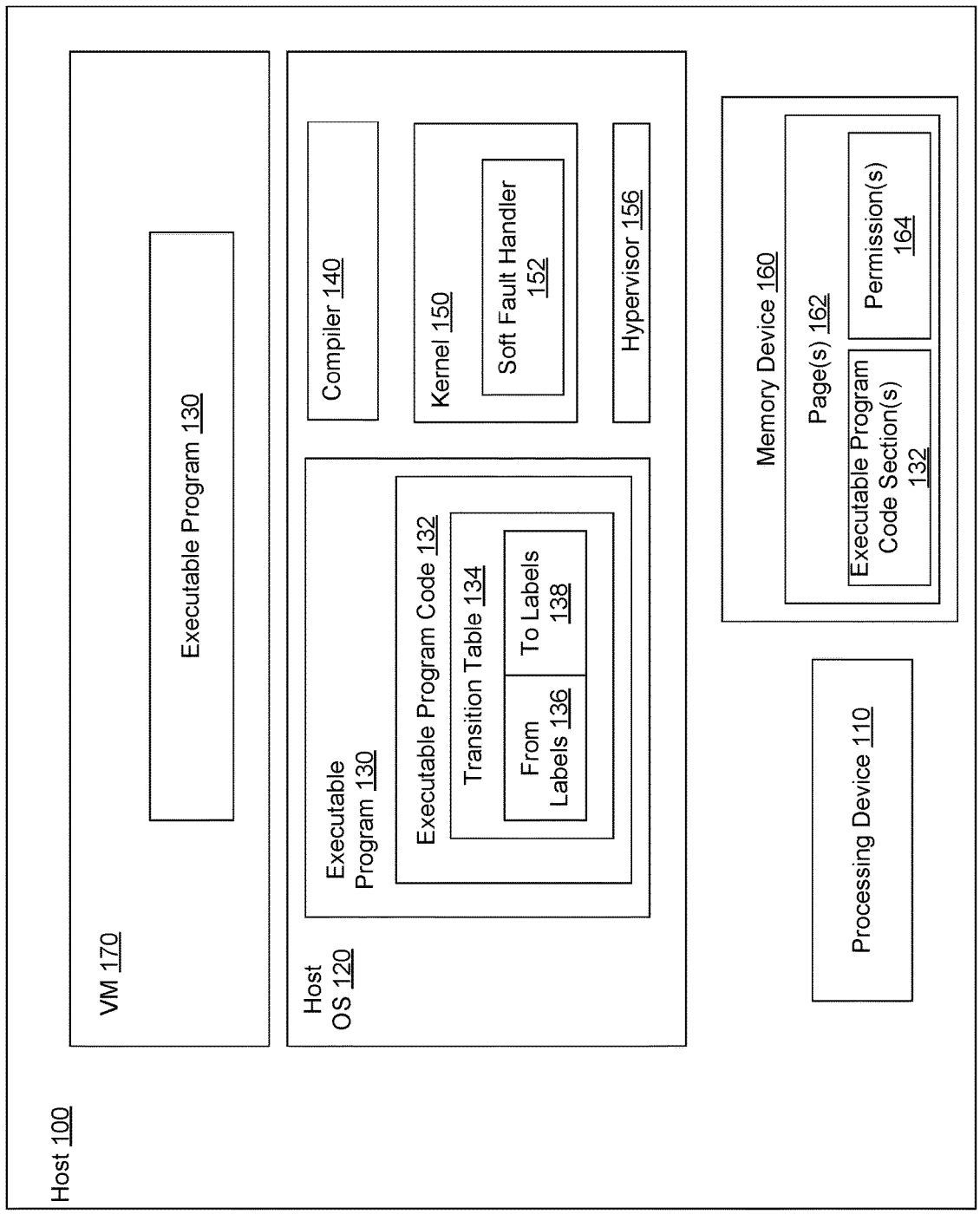
FIG. 1 is a block diagram that illustrates an example computing system, in accordance with one or more aspects of the present disclosure.

Executable program code may refer to a file that includes compiled source code that is executable by a processing device. Executable program code may be referred to as a "binary" interchangeably herein. The executable program code may implement a computer program. Certain executable program code may be vulnerable to various types of security issues. For example, executable program code that includes compiled source code that implement audio/video codecs, network packet dumpers, and/or protocol parsing may be targeted and exploited by malicious users. The malicious users may cause these portions of compiled source code to write an unexpected return address. The unexpected return address may cause the executable program code to transition to (e.g. "jump to") a section of the executable program code that is not expected to be run. Once inside the section of the executable program code that was not supposed to be accessed, the exploit may corrupt data, steal data, and/or cause some other undesirable behavior of the executable program code.

Accordingly, aspects of the present disclosure address the above and other deficiencies by using security labels (referred to as "labels" herein) to isolate sections of an executable program code from accessing other sections of the executable program code that should not be accessed. When source code is compiled, the compiler (or the programmer) may leave annotations in the resulting executable program code that indicate which sections of the compiled source code are identified as not directly calling one another and/or which sections of the compiled source code are identified as directly calling one another. During compilation, the source code and associated data may be separated into sections. In some instances, a section may include functions that perform a similar type of operation (e.g., graphic user interface (GUI) functions may be sectioned into a GUI section). Each name of the sections may be used as a label that is associated with its respective section. A transition table may be created or maintained in view of the annotations. The transition table may include one or more mappings of allowed transitions from one label associated with one section of the executable program code to another label associated with another section of the executable program code.

When a host operating system (OS) kernel loads the executable program code into memory (e.g., random access memory (RAM)), the host OS may load each section of the executable program code that performs a function into a separate page of memory. As such, each page of memory may include one or more memory map permissions (e.g., read, write, execute) that may be configurable to control the flow of execution between the various sections of the executable program code loaded in the pages. For example, a first page of the memory that includes a first section of the executable program code having an entry point (e.g., the main function that executes first) to the program implemented by the executable program code may have its permissions configured to at least allow execution. The remaining pages of memory including the remaining sections of the executable program code may be configured with permissions to disable execution. When the first section of the executable program code makes a call to a function in another section of the executable program code included in another page of memory, the processing device may take a fault. A soft fault handler may check the transition table to determine whether the transition from a first label associated with the first section of the executable program code to a second label associated with a second section of the executable program code including the called function is allowed.

If the transition is allowed in view of the transition table, the soft fault handler may remove at least the execution permission for the first page including the first section of the executable program code and may change the permissions for a second page of memory that includes the second section associated with the second label to enable execution of the second section. If the transition is not allowed, one or more preventative actions may be performed. In some instances, the preventative action may include terminating execution of the executable program code. In another example, the preventative action may include suspending execution of the executable program implemented by the executable program code, cloning the executable program code to a virtual machine operating as a sandbox, and transfer control to the virtual machine to execute the executable program code to carry out the transition identified as being suspicious. A sandbox may refer to a virtual machine with a set of tightly controlled resources in which to run. For example, the sandbox may be partitioned an isolated portion of memory to operate, and network access, the ability to inspect the host system or read from input devices may be prohibited or heavily restricted. Once complete, the result from the execution of the executable program code in the virtual machine may be returned to the calling function and the virtual machine may be suspended.

In another implementation, the annotations may identify the sections of the executable program code that are to be isolated. This identification may be performed in view of the nature of the operations included in the section. For example, certain sensitive data that is modified or certain operations performed by functions in the section may warrant isolating the section. One or more virtual machines may be instantiated by allocating a portion of memory. The section(s) of the executable program code that are identified as deserving isolation may be loaded to the one or more virtual machines at the time the other sections that do not need isolation are loaded to one or more pages of memory. The execution of the one or more virtual machines may be suspended and a processing device may begin executing the sections of the executable program code in the memory. In response to a call originating from the sections in the memory to a function in a section of the executable program code loaded on the one or more virtual machines, the processing device may suspend execution of the executable program code, resume execution of the virtual machine including the section with the called function to execute the function.

As such, security of the computing system may be improved by controlling flow of execution within an executable program code using labels. Some advantages provided by the improved security may include preventing corruption of data that is associated with and/or manipulated by the executable program code, preventing the executable program code from performing unexpected and/or undesirable operations that may cause program instability and/or system instability, and the like. The improved security may improve processing of the executable program code and/or of the processing device executing the executable program code by preventing corruption of data and/or execution of malicious code.

For example, any attempt to transition from one label associated with a first section to another label associated with a second section may be checked in a transition table prior to allowing such a transition to occur. Further, loading each section to separate pages of memory with respective permissions may enable granular control defining which sections of the executable program code are allowed to execute and which sections of the executable program code are not allowed to execute. If the transition is allowed, the permissions may be updated for the page of memory including the section to which transitioning is desired. If the transition is not allowed, one or more preventative actions may be performed. Security may also be enhanced by isolating certain sections of the executable program code in a virtual machine such that those sections of the executable program code cannot affect other components of the computing system when executed.

FIG. 1 is a block diagram that illustrates an example host computer system 100, in accordance with one or more aspects of the present disclosure. The computing system 100 may be a server, a workstation, a personal computer (PC), a mobile phone, a palm-sized computing device, a personal digital assistant (PDA), etc. "Computer system" as used herein may be and/or include a system comprising one or more processors, one or more memory devices, and one or more input/output (I/O) interfaces.

As illustrated, host computer system 100 may include one or more processing devices 110 (e.g., host central processing units (CPUs)) communicatively coupled to memory devices 160. Local connections within host computer system 100, including connections between processors 110 and memory devices 160, may be provided by one or more local buses (not shown) of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some implementations.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

The host computer system 100 may execute (run) a host operating system (OS) 120. The host OS 120 may be Red Hat® Linux®, Microsoft® Windows®, Solaris®, Mac® OS, etc. The host OS 120 may be implemented as computer instructions stored on a computer-readable medium and executable by the processing device 110. The host OS 120 may manage computer hardware and application resources and may provide common services for computer programs. The host OS 120 may include an executable program 130 implemented as executable program code 132. The host OS 120 may execute the executable program 130 to perform one or more functions implemented by the executable program code 132. Although, one executable program 130 is depicted, it should be understood that numerous executable programs 130 may be installed on the host OS 120.

The host OS 120 may also include a compiler 140. The compiler 140 may refer to a computer program that transforms computer code written in a first programming language (e.g., human readable programming language) into another programming language (e.g., executable program code). A programmer may develop a program that includes source code written in the first programming language. The program may include various operations (e.g., audio/video codecs, network packet dumping, protocol parsing code, etc.) that are more at risk for exploitation by a malicious user. In some implementations, the compiler 140 may be configured to identify these operations in source code during compilation by identifying certain function calls, system calls, types of data being manipulated, certain libraries, or the like, that should be isolated. The compiler 140 may process the source code and also be configured to identify which sections of the executable program code 132 are allowed to call other sections of the executable program code 132 and/or which sections of the executable program code 132 are not allowed to call other sections of the executable program code 132. The compiler 140 may insert annotations in the executable program code 132 to specify the identified operations that should be isolated and/or allowed/disallowed transitions between sections of the executable program code 132. Alternatively or additionally, a programmer may insert annotations in the executable program code 132 that specifies operations that should be isolated and/or transitions that should be allowed or disallowed.

Also, during compilation, the compiler 140 may separate the source code and associated data into sections. The compiler 140 may group functions that perform the same type of operations or manipulate the same type of data into a section. Alternatively or additionally, the programmer may section functions in the source code. A section name may be dynamically generated or provided by a programmer for each of the sections. To dynamically generate the section names, the compiler 140 may determine what type of functions are performed in the section and provide a name similar to the function type. For example, a section that performs functions related to a graphic user interface (GUI) may be provided a section name including "GUI".

The compiler 140 may using the section names in the executable program code 132 as a set of labels for the various sections. As such, each label may be associated with a respective section of executable program code 132. The set of labels and the annotations may be used to create a transition table 134 as part of the executable program code 132 that is output by the compiler 140. The transition table 134 may include mappings of allowable transitions from a first set of labels (e.g., from labels 136) to a second set of labels (e.g., to labels 138). In some implementations, the transition table 134 may be already created by the programmer or provided in the source code. In some implementations, the transition table 134 may be stored as part of the executable program code 132 or stored separately (e.g., in a separate memory location, such as host memory, memory device 160, etc.).

The host OS 120 may also include a kernel 150. The kernel 150 may function as a bridge between the executable program 130, the compiler 140, and other computer programs and actual data processing performed at the hardware level (e.g., processing device 110, memory device 160, I/O device, etc.). The kernel 150 may manage the communication between the hardware and software components of the host computer system 100.

To execute the executable program 130, the kernel 150 of the host OS 120 may load each section of the executable program code 132 into a separate page 162 of the memory device 160 (e.g., RAM). That is, a first section of the executable program code 132 may be loaded into a first page of the memory device 160, a second section of the executable program code 132 may be loaded into a second page of the memory device 150, and so forth, until every section of the executable program code 132 is loaded into a respective page 162. In some implementations, the sections that are loaded may include sections that perform one or more functions, as opposed to a section that includes just data. In another implementation, every section (e.g., performs a function and/or includes data) may be loaded into a separate page 162.

An advantage gained by loading a separate section of the executable program code 132 into a separate page 162 may include that each page 162 has its own memory map permissions 164 (sometimes referred to as "memory map flags" or just "permissions" herein). The permissions 164 may include enabling/disabling read, write, and/or execute abilities for the contents of the associated page 132. Dynamically configuring the permissions 164 for the pages 162 as the executable program 130 executes in view of the transition table 134 may enable enhancing security by preventing a section of the executable program code 132 from calling into and transitioning to an unexpected section of the executable program code 132.

In some implementations, at any given time, a single page 162 may be configured with permissions 164 to at least enable execution and the remaining pages 162 may be configured permissions 164 to at least disable execution. For example, initially, once the sections of the executable program code 162 are loaded into separate pages 162, a first page 162 including a first section with an entry point (e.g., main function) to the executable program 130 may be configured with permissions 164 to read and execute (e.g., +rx), and the remaining pages including remaining sections may be configured with permissions 164 that disable reading, writing, and executing (e.g., −rwx). When the first section in the first page executes a function that calls into a second section, a page fault may be taken by the processing device 110. The page fault may be taken because the requested second page 162 is not mapped in the current set of memory resident pages 162 since the permissions 164 of the second page indicate that the second page is not readable, writable, and/or executable.

A soft fault handler 152 included in the kernel 150 may receive the page fault. The soft fault handler 152 may be implemented as computer instructions and may be configured to handle soft page faults (e.g., a fault that occurs when a requested page is located in memory but does not have sufficient permissions to read, write, and/or execute). The soft fault handler 152 may inspect the transition table 134 to determine whether the transition from a first label 136 associated with the first section is allowed to a second label 138 associated with the second section. If the transition is allowed, the soft fault handler 152 may remove the permissions 164 enabling reading and executing for the first page 162 including the first section and may configure the permissions 164 enabling reading and executing (e.g., +rx) for the second page 162 including the second section. Further, the soft fault handler 152 may transfer control back to the executable program 130 to continue execution by executing the function called in the second section. In some implementations, any time a transition from one section to another section is requested by the executable program 130, a page fault may be taken and the transition table 164 may 134 may be checked prior to allowing the transition and modifying the permissions 164.

If the transition is not allowed, one or more preventative actions may be performed. For example, the execution of the executable program 130 may be terminated. In another implementation, the host OS 120 may suspend execution of the executable program 130. A hypervisor 156 running on the host OS 120 may allocate and instantiate a virtual machine 170. In some implementations, the virtual machine 170 may be instantiated when the executable program code 132 is loaded into the pages 162. The processing device 110 may clone the executable program 130 to the virtual machine 170. In some implementations, the virtual machine 170 may operate as a sandbox that has restricted access to resources of the host computer system 100.

For example, the virtual machine 170 may not have any other code mapped and/or loaded on it besides the sections of code that perform the suspicious transition or section(s) identified as being good candidates for isolation (e.g., perform a certain type of operation, manipulate certain type of data, etc.). The virtual machine 170 may not include any kernel executable code, may not be capable of executing a binary, may not have a file system mounted, and there may be no other executable program code in virtual memory for the virtual machine 170. As such, if the exploit that may be introduced into the executable program code 132 is successful, there is nothing (e.g., files, programs, data, etc.) included in the virtual machine 170 to corrupt and/or leverage. In another implementation, the virtual machine 170 may include minimal kernel code, such as the soft fault handler 152, which is configured to receive page faults from transitions between sections of the executable program code 132, check the transition table 134 on the virtual machine 170, and/or modify permissions 164 when transitions are allowed, as discussed above.

In yet another implementation, the virtual machine 170 may pass a page fault to the hypervisor 156 upon an attempt by the executable program code 132 to perform the suspicious transition, and the hypervisor 156 may handle the page fault by checking the transition table 134 to determine whether the transition is allowed. If so, the hypervisor 156 may change the permissions of the pages to enable the requested section to read and execute and remove the read and execute permissions from the page calling the requested section. If not, the hypervisor 156 may perform one or more preventative actions described herein.

In another implementation, sections of the executable program code 132 that are identified as being susceptible to exploitation (e.g., include certain identified functions and/or operations) or are otherwise good candidates for isolation may be loaded on the virtual machine 170. These sections of the executable program code 132 may be loaded onto the virtual machine 170 when the remaining sections of the executable program code 132 are loaded into the separate pages of the memory device 160. Once the virtual machine is setup with the sections of the executable program code 130, the execution of the virtual machine 170 may be suspended. In this implementation, the host OS 120 may begin executing the executable program 130 and when a function in one of the sections on the virtual machine is called, the processing device may suspend execution of the executable program code 132 and resume execution of the virtual machine 170. Control may be transitioned to the virtual machine 170 to execute the called function in the section on the virtual machine 170. Such a technique may provide barrier to contain any actions performed by the isolated section to the environment provided by the virtual machine 170 while leaving the rest of the components of the host computer system 100 unaffected.

The hypervisor 156 may be a product of Red Hat® and may include Red Hat® Virtualization (RHV), which is a product based on a kernel-based virtual machine (KVM) hypervisor. Additionally or alternatively, the hypervisor 122 may be a vSphere hypervisor of VMware®, a Hyper-V hypervisor of Microsoft®, or a hypervisor included in Oracle® VM VirtualBox. Hypervisor 156 may be a component of host OS 120 executed by the corresponding host computer system 100. Alternatively, hypervisor 156 may be provided by an application running under host OS 120, or may run directly on the corresponding host computer system 100 without an operating system beneath it. Hypervisor 156 may abstract the physical layer, including processors, memory, I/O devices, etc. and present this abstraction to virtual machines 170 as virtual devices, including virtual processors, virtual memory, virtual I/O devices, etc. A hypervisor 156 may abstract the physical layer and present this abstraction to virtual machines 170 to use, by providing interfaces between the underlying hardware and virtual devices of virtual machines.

The virtual machine 170 may or may not include a guest operating system. The virtual machine 170 may execute the guest operating system to manage its resources. The virtual machine 170 may run the same or different guest operating system than the host OS 120, such as Microsoft Windows®, Linux®, Solaris®, Mac® OS, etc. In some implementations, the virtual machine 170 may only be loaded with and execute one or more sections of the executable program code 132 without a guest operating system or any other executable code.

The techniques described herein may be implemented between shared libraries in the same process space, between different virtual machines 170 on the same processing device 110, and/or offloaded to a co-processor, such as Intel® SGX or AMD® Secure CoProcessor. Other techniques may be layered on depending on the implementation. For example, if the technique is implemented using virtual machines 170 for separation, on certain host computer systems 100, secure encrypted memory may be used to ensure memory (RAM) in isolated bits is encrypted from the outside perspective, and vice versa.

Figure 2:
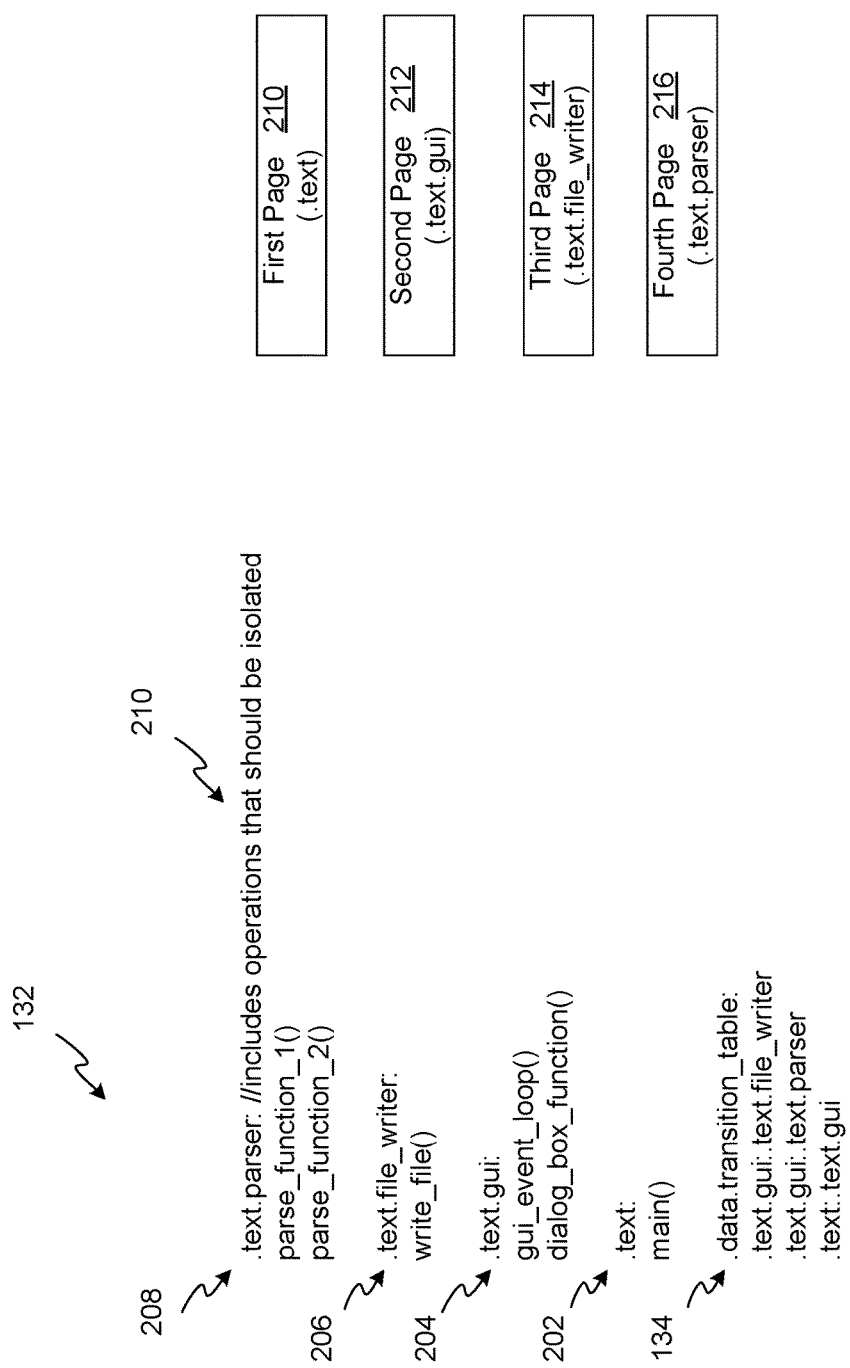
FIG. 2 depicts example executable program code output by a compiler, in accordance with one or more aspects of the present disclosure.

FIG. 2 depicts example executable program code 132 output by the compiler 140, in accordance with one or more aspects of the present disclosure. As depicted, the executable program code 132 is laid out with various functions and data organized by sections having section names. In some instances, the functions may be organized in certain sections based on the type of operations, data, libraries, etc. to which the functions are related. For example, a first section 202 may have a section name ".text" and include an entry point function (e.g., main( )) for the executable program code 132, a second section 204 may have a section name ".text.gui" and include one or more functions (e.g., gui_event_loop( ) and dialog_box_function( )) related to graphic user interfaces, a third section 206 may have a section name ".text.file_writer" and include one or more functions (e.g., write_file( )) related to writing files, a fourth section 208 may have a section name ".text.parser" and include one or more functions (e.g., parse_function_1( ) and parse_function_2( )) related to parsing. Further, an annotation 210 may be included that indicates that the section 208 ".text.parser" includes operations that should be isolated.

The compiler 140 may use the section names as labels to associate with the various sections 202, 204, 206, and 208. Further, the compiler 140 may identify the sections in the executable program code 132 that are not allowed to transition to one another in view of the annotations and/or the sections in the executable code 132 that are allowed to transition to one another in view of the annotations. The compiler 140 may create or maintain the transition table 134 that specifies allowed transitions between the labels associated with the sections 202, 204, 206, and 208 in view of the annotations.

For example, the compiler 140 may identify the section 208 ".text.parser" as being a good candidate for isolation due to the annotation 210 that indicates the section 208 should be isolated. Accordingly, the compiler 140 may determine that the section 208 should not be allowed to transition to any other sections, except for the section that called into the section 208. That is, in some implementations, even when isolated, a section may be able to return to the section that called it with return data. However, a return check of whether the transition from the section 208 to the calling section may be performed using the transition table 134.

The transition table 134 may include three transitions, although it should be understood that any suitable number of transitions may be included. In some implementations, the transition table 134 includes mappings of allowed transitions from a label 136 to a different label 138. For example, the depicted transition table 134 specifies that transitions from label ".text.gui" to label ".text.file_writer" is allowed, from label ".text.gui" to label ".text.parser" is allowed, and from label ".text" to label ".text.gui" are allowed. As such, the section 202 with label ".text" may just call functions in the section 204 ".text.gui" and cannot transition to another section (e.g., section 206 or section 208). Further, because the annotation 210 indicated that the section 208 should be isolated, the transition table 134 may not include allowable transitions from label ".text.parser" to any other section, as depicted. The section 208 may be transitioned into from the section 204 having the label ".text.gui" based on the mapping ".text.gui:.text.parser" in the transition table 134. In some implementations, the section 208 may return to the calling section 204.

The kernel 150 may load the sections 202, 204, 206, and 208 into their own separate pages 162 of memory. For example, a first page 210 may be loaded with the section 202 (".text"), a second page 212 may be loaded with the section 204 (".text.gui"), a third page 214 may be loaded with the section 206 (".text.file_writer"), and a fourth page 216 may be loaded with the section 208 (".text.parser"). Each page includes its own configurable permissions 164, such as read, write, and/or execute.

Initially, in some implementations just the first page 210 including the section 202 with the entry point function (e.g., main( )) may be configured with read and execute permissions 164, and the remaining pages 212, 214, and 216 may be configured with permissions 164 that disable reading, writing, and executing the respective sections 204, 206, and 208. The executable program 130 implemented by the executable program code 132 may begin executing. When the entry point function in main calls a function (e.g., gui_event_loop( )) in the section 204 ".text.gui", the processing device 110 takes a fault and the soft fault handler 152 checks the transition table 134 to determine whether a transition from the label ".text" associated with the first section 202 in the first page 210 that is currently executing is allowed to transition to the label ".text.gui" associated with the second section 204 in the second page 212 that includes the function (e.g., gui_event_loop( )) that is being called.

The transition table 134 includes a mapping ".text:.text.gui" that specifies the transition is allowed. As such, the soft fault handler 152 removes the read and execute permissions from the first page 210 including the first section 202 and changes permissions 164 for the second page 212 to enable reading and executing the second section 204 ".text.gui". The soft fault handler 152 may transfer control back to the executable program 130 to continue executing. When the called function (e.g., gui_event_loop( )) returns, the opposite transition may occur. For example, a page fault may be taken and the transition table 134 may be checked to determine whether the return transition is allowed. In this instance, since a mapping of ".text:.text.gui" is included in the transition table 134, returning from ".text.gui" to ".text" may be allowed and the permissions may be swapped as discussed above.

If at any time a function in one section tries to call some function in another section, and the transition is not allowed in the transition table 134, one or more preventative actions may be performed (e.g., the kernel 150 sends a signal to the executable program 130 to terminate execution, the executable program may be cloned to a virtual machine for execution, etc.). For example, the functions (e.g., parse_function_1( ) and parse_function_2( )) in the section 208 may not be allowed to call functions in other sections because there is no mapping in the transition table 134 from the label ".text.parser" to another label.

Figure 3:
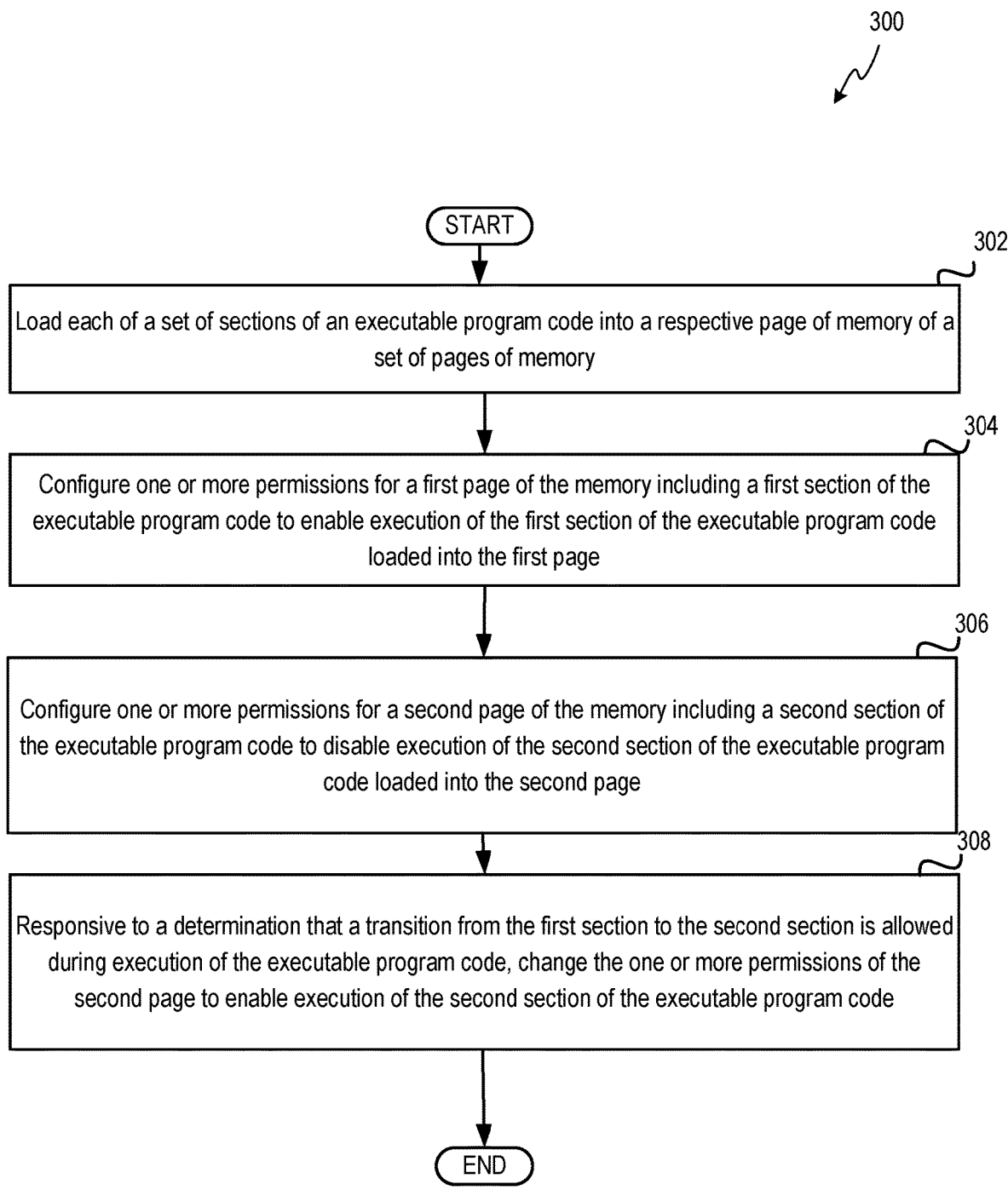
FIG. 3 depicts a flow diagram of an example method for using labels to control transitions between sections of executable program code, in accordance with one or more aspects of the present disclosure.

FIG. 3 depicts a flow diagram of an example method 300 for using labels to control transitions between sections of executable program code 132, in accordance with one or more aspects of the present disclosure. Method 300 and each of its individual functions, routines, subroutines, or operations may be performed by one or more processing devices of the computer device executing the method 300. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by the host OS 120 executed by one or more processing devices of the host computer system 100.

At block 202, a processing device may load each of a plurality of sections of an executable program code 132 into a respective page 162 of the memory device 160. The sections of the executable program code 132 may have been organized by the compiler 140 during compilation. The processing device may use a section name as a label to associate with the respective section. Further, the processing device may identify, using one or more annotations 210 in the executable program code 132, one or more sections of the executable program code 132 that are allowed to transition to one another and/or one or more sections that are not allowed to transition to one another. The processing device may maintain a transition table 134 that specifies allowed transitions between the labels associated with the sections in view of the annotations.

At block 304, the processing device may configure one or more permissions 164 for a first page 210 of the memory including a first section 202 of the executable program code 132 to enable execution of the first section 202 of the executable program code 132 loaded into the first page 210. The first section 202 may be associated with a first label (e.g., ".text") and may include an entry point function (e.g., main( )).

At block 306, the processing device may configure one or more permissions 164 for a second page 212 of the memory including a second section 204 of the executable program code 132 to disable execution of the second section 204 of the executable program code 132 loaded into the second page 212. The second section 204 may be associated with a second label (e.g., ".text.gui"). In some implementations, at any time, a single page of the pages including the sections of the executable program code 132 may be configured with permissions 164 that enable execution of a section loaded to the single page and remaining pages of the pages including sections of the executable program code 132 may be configured with permissions 164 that disable execution of the remaining sections loaded to the remaining pages.

At block 308, responsive to a determination that a transition from the first section 202 to the second section 204 is allowed during execution of the executable program code 132, the processing device may change the one or more permissions 164 of the second page 212 to enable execution of the second section 204 of the executable program code 134 and change the one or more permissions 164 of the first page 210 to disable execution of the first section 202 of the executable program code 132. In some implementations, the processing device may use the transition table 134 to determine whether the transition from the first section 202 to the second section 204 is allowed during execution of the executable program code by determining whether a mapping from the label (e.g., ".text") associated with the first section 202 to the label (e.g., "text.gui") associated with the second section 204 is present. The processing device may receive a page fault when the transition from the first section to the second section is attempted and the page fault handler 154 may check the transition table 134 to determine whether the transition is allowed.

Responsive to a determination that the transition from the first section to the second section is not allowed (e.g., when the mapping from the label associated with the first section to the label associated with the second section is not present in the transition table 134), one or more preventative actions may be performed. For example, the execution of the executable program code 132 may be terminated, or the executable program code 132 may be cloned to the virtual machine 170, as further described below with reference to method 500 of FIG. 5.

Figure 4:
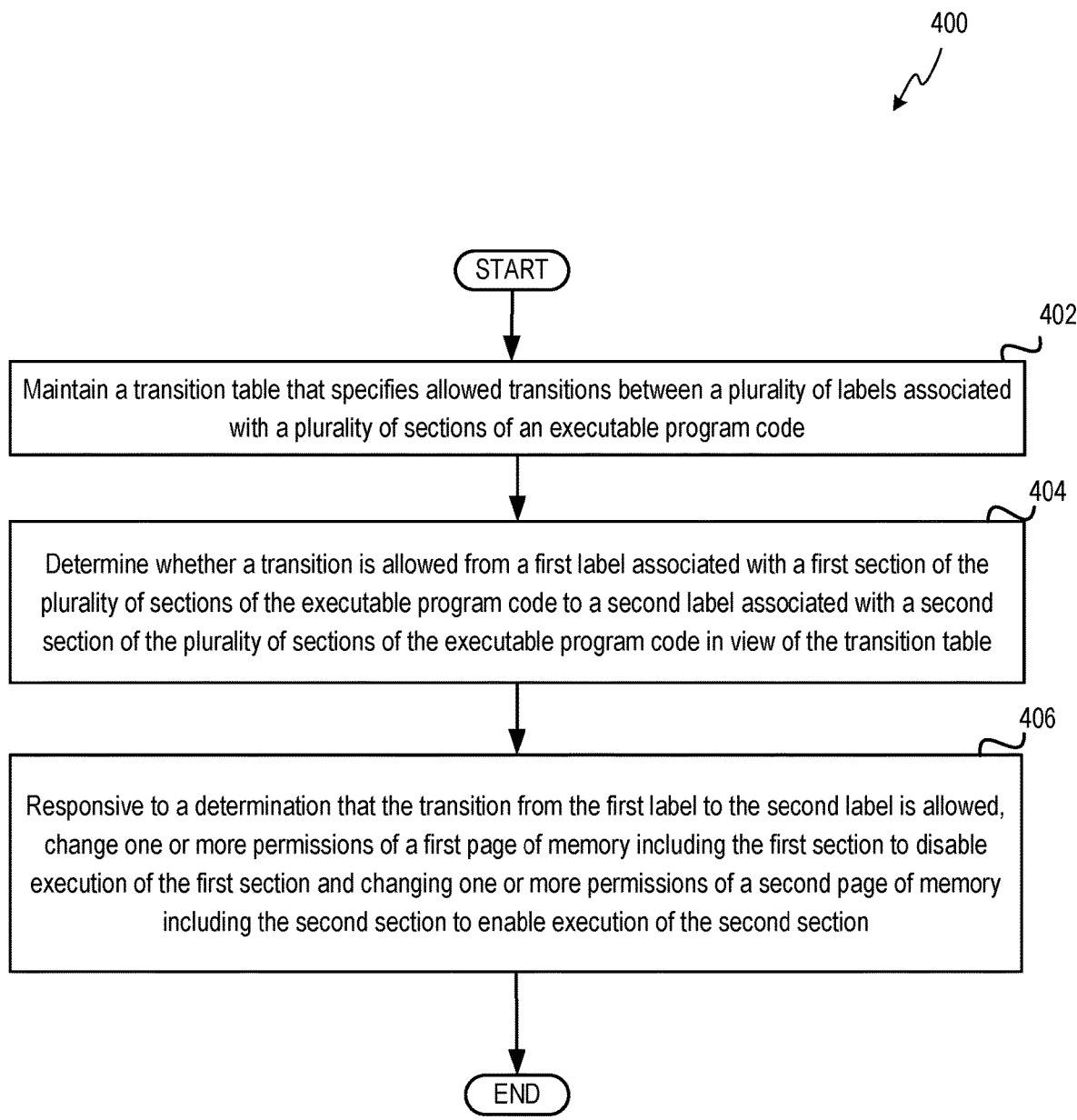
FIG. 4 depicts a flow diagram of an example method for using labels to control transitions between sections of executable program code in view of a transition table, in accordance with one or more aspects of the present disclosure.

FIG. 4 depicts a flow diagram of an example method 400 for using labels to control transitions between sections of executable program code 132 in view of a transition table 134, in accordance with one or more aspects of the present disclosure. Method 400 includes operations performed by the host OS 120. Also, method 400 may be performed in the same or a similar manner as described above in regards to method 300. Method 400 may be performed by processing devices of the host computer system 100.

At block 402, the processing device may maintain a transition table 134 that specifies allowed transitions between a set of labels associated with a set of sections of an executable program code 132. The processing device may identify, using one or more annotations in the executable program code 132, one or more sections of the set of sections of the executable program code 132 that are allowed to transition to one another, and/or one or more sections that are not allowed to transition to one another. The processing device may associate the set of labels with the set of sections and create the transition table 134 in view of the one or more annotations in the executable program code 132.

At block 404, the processing device may determine whether a transition is allowed from a first label associated with a first section 202 of the executable program code 132 to a second label associated with a second section 204 of the executable program code 132 in view of the transition table 134. Each section of the executable program code 132 may be loaded to separate pages 162 of the memory device 160. The attempted transition may cause a page fault to be taken by the processing device because the permissions 164 of the requested section 204 may be disabled for reading, writing, and/or executing.

At block 406, responsive to a determination that the transition from the first label to the second label is allowed, the processing device may change one or more permissions 164 of a first page 210 of memory including the first section 202 to disable execution of the first section 202 and changing one or more permissions 164 of a second page 212 of memory including the second section 204 to enable execution of the second section 204. Responsive to a determination that the transition from the first label to the second label is not allowed, the processing device may terminate execution of the executable program code 132. In another implementation, the processing device may perform a different preventative action, as further described with reference to method 500 of FIG. 5.

In some implementations, the processing device may execute the second section 204 and a function in the second section 204 may attempt to transition back to the first section 202. As such, the processing device may receive a page fault in response to the attempt to transition from the second section 204 to the first section 202 during execution of the second section 204 because the permissions for the first page 210 including the first section 210 disable reading, writing, and/or executing. The processing device may determine whether the transition is allowed from the second label associated with the second section 204 to the first label associated with the first section 202. Responsive to a determination that the transition from the second label to the first label is allowed, the processing device may change the one or more permissions 164 of the second page 212 including the second section 204 to disable reading and execution of the second section 204 and change the one or more permissions 164 of the first page 210 including the first section 202 to enable reading and execution of the first section 202. The processing device may transfer control back to the executable program 130 to execute the first section 202.

Figure 5:
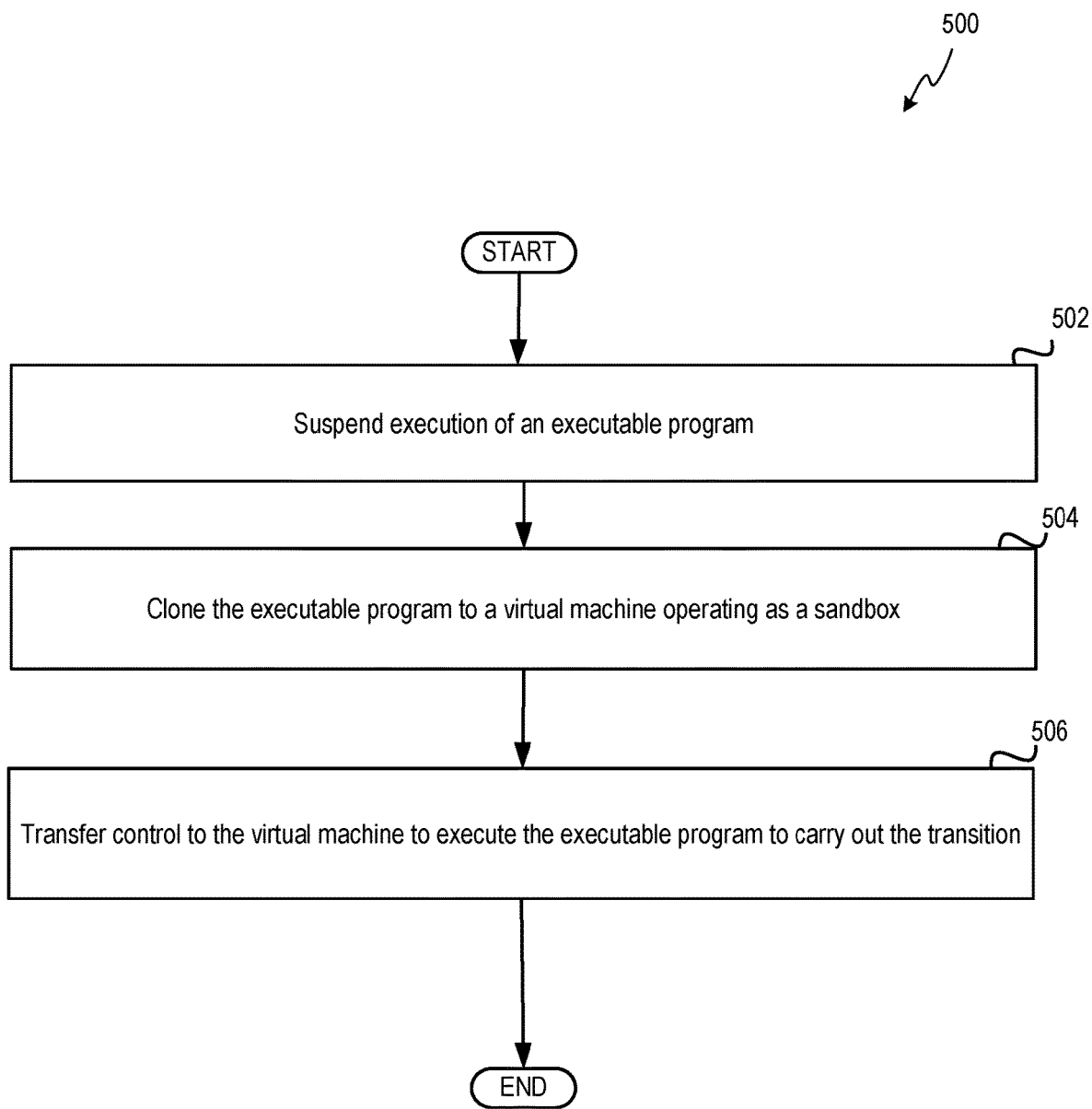
FIG. 5 depicts a flow diagram of an example method for using labels to transfer control to a virtual machine in response to a transition between labels not being allowed, in accordance with one or more aspects of the present disclosure.

FIG. 5 depicts a flow diagram of an example method 500 for using labels to transfer control to a virtual machine 170 in response to a transition between labels not being allowed, in accordance with one or more aspects of the present disclosure. Method 500 includes operations performed by the host OS 120. Also, method 500 may be performed in the same or a similar manner as described above in regards to method 300. Method 500 may be performed by processing devices of the host computer system 100.

In some implementations, the processing device may identify, using one or more annotations in the executable program code 132, one or more sections of a set of sections of the executable program code 132 that are allowed to transition to one another, and/or one or more sections that are not allowed to transition to one another. The processing device may associate a set of labels to the set of sections of the executable program code 132, and create a transition table 134 in view of the one or more annotations. The transition table 134 mappings of allowable transitions from a first subset of the labels associated with a first subset of the sections to a second subset of the labels associated with a second subset of the sections.

The processing device may execute the executable program 130 including sections of the executable program code 132. Each of the sections may be loaded to separate pages 162 of the memory device 160. A first section 202 in the executable program code 132 may call a function in a second section 204 of the executable program code 132. The processing device may determine a transition is allowed from a first label (".text") associated with the first section 202 to a second label (".text.gui") associated with the second section 204. If the transition is allowed, the permissions of the pages including the sections may be switched such that a first page 210 including the first section 202 has read and/or execute permissions disabled and the second page 212 including the second section 204 has read and/or execute permissions enabled.

At block 502, responsive to a determination that the transition is not allowed, the processing device may suspend execution of the executable program 130. The processing device may use the transition table 134 to determine whether the transition is allowed from the first label (".text") associated with the first section 202 to the second label (".text.gui") associated with the second section 204.

At block 504, the processing device may clone the executable program 132 to a virtual machine 170 operating as a sandbox. Cloning the executable program 130 may include the processing device copying just the second section 204 of the executable program code 132 to the virtual machine 170. The virtual machine 170 may exclusively execute the functions of the second section 204 of the executable program code 132 and the virtual machine 170 may not execute any other code, as discussed above. In another implementation, the entire executable program code 132 may be copied to the virtual machine 170 by copying a virtual address space of the executable program 130 to the virtual machine 170.

At block 506, the processing device may transfer control to the virtual machine 170 to execute the executable program 132 to carry out the transition. For example, the processing device may execute a virtual machine entry instruction. In some implementations, when the code executed on the virtual machine 170 returns, the execution of the virtual machine 170 may be suspended, the executable program 130 operating on the host OS 120 may be restarted, and any data computed by the code may be returned to the executable program 130 operating on the host OS 120 that continues execution.

Figure 6:
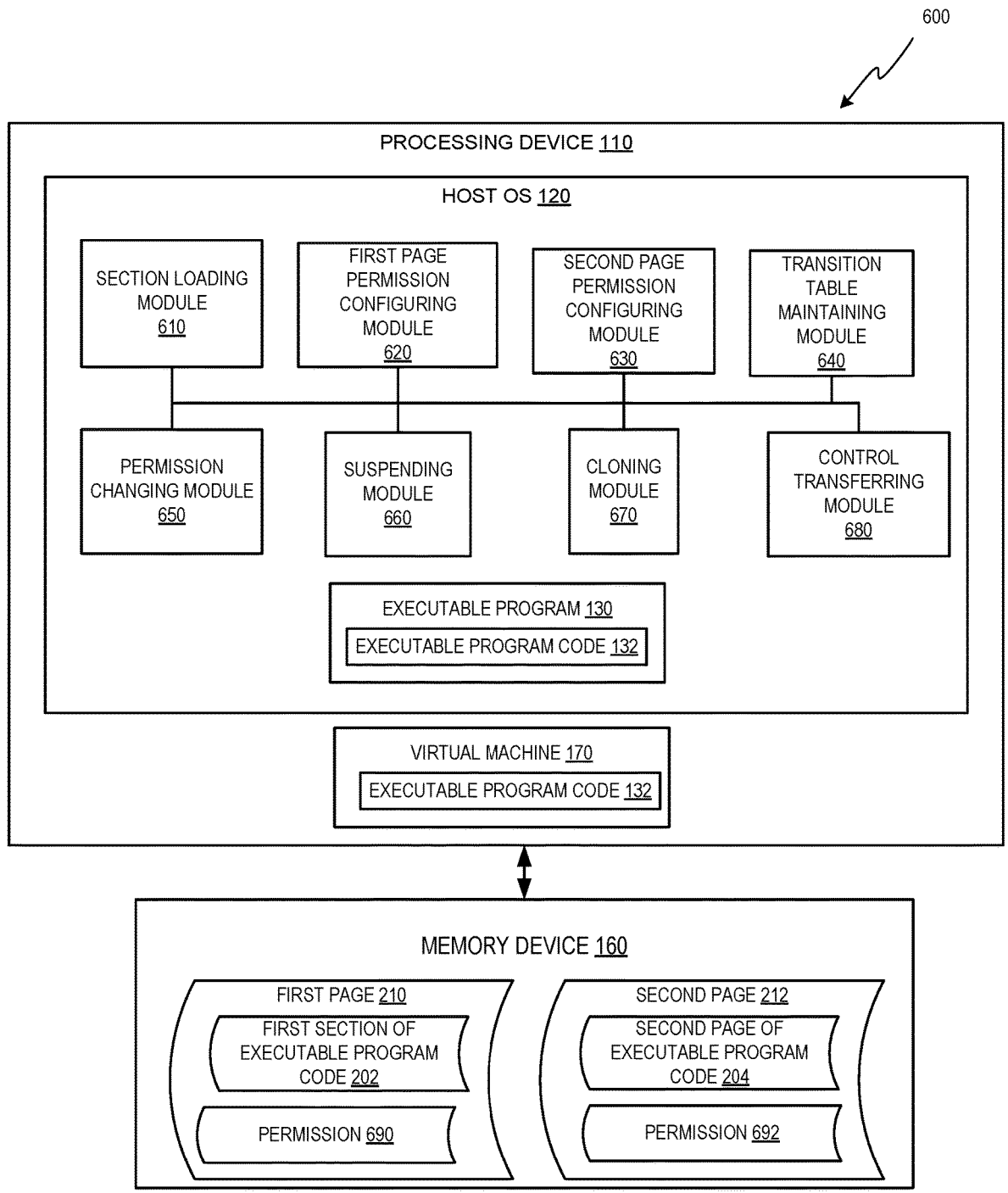
FIG. 6 depicts a block diagram of an example computer system for performing the methods of FIGS. 3-5, in accordance with one or more aspects of the present disclosure.

FIG. 6 depicts a block diagram of an example computer system 600 for performing the methods 300, 400, and/or 500 of FIGS. 3-5, in accordance with one or more aspects of the present disclosure. Computer system 600 may be the same or similar to the host computer system 100 and may include one or more processing devices 110 coupled to one or more memory devices 160. In the example shown, computer system 600 may include section loading module 610, first page permission configuring module 620, second page permission configuring module 630, transition table maintaining module 640, permission changing module 650, suspending module 660, cloning module 670, and control transferring module 680. One or more of the modules may be used to implement each of the methods 300, 400, and/or 500.

Section loading module 610 may load each section of the executable program code 132 into a respective page 162 of the memory device 160. As depicted, the first section 202 of the executable program code 132 is loaded into the first page 210 and the second section 204 of the executable program code 132 is loaded into the second page 212. Each page 210 and 212 may have one or more configurable permissions (e.g., read, write, execute) 690 and 692, respectively.

First page permission configuring module 620 may configure the permissions 690 for the first page 210 including the first section 202 to enable reading and executing of the first section 202 loaded into the first page 210. The first section 202 may be associated with a first label.

Second page permission configuring module 630 may configure the permissions 692 for the second page 212 including the second section 204 to enable reading and executing of the second section 204 loaded into the second page 212. The second section 204 may be associated with a second label.

Transition table maintaining module 640 may maintain the transition table 134 that specifies allowed transitions between a set of labels associated with the sections of the executable program code 132. In some implementations, the transition table 134 may be provided by a programmer or the transition table 134 may be dynamically created, as discussed above.

Permission changing module 650 may, responsive to determining that certain transitions between labels are allowed, modify the permissions of the pages including the sections involved in the transition. In some implementations, the transition table 134 may be used to make this determination. For example, the permissions 690 of the first page 210 may initially be configured to enable reading and executing the first section 202, and the permissions 692 of the second page 212 may initially be configured to disable reading, writing, and executing the second section 204. Upon determining that the transition from the first label associated with the first section 202 to the second label associated with the second section 204 is allowed in the transition table 134, the permissions 690 of the first page 210 may be changed to remove reading and executing, and the permissions 692 of the second page may be change to enable reading and executing the second section 204.

In implementations where the transition between labels is not allowed in the transition table 134, one or more preventative actions may be performed. For example, the execution of the executable program 130 may be terminated. In another implementation, suspending module 660 may suspend execution of the executable program 130.

Cloning module 670 may clone the executable program 130 to the virtual machine 170 operating as a sandbox. The cloning module 670 may clone just a portion of the executable program code 132 that includes sections associated with the prohibited transition or may clone the entire executable program 130 to the virtual machine 170. In implementations, where the executable program 130 is cloned, the cloning module 670 may copy the virtual address space of the executable program 130 to the virtual machine 170.

Control transferring module 680 may transfer control from the executable program 130 to the virtual machine 170 to execute the executable program 130 to carry out the prohibited transition on the virtual machine 170. In this way, any effects that an exploit that may be introduced into the executable program 130 may be contained within the sandboxed virtual machine 170.

Figure 7:
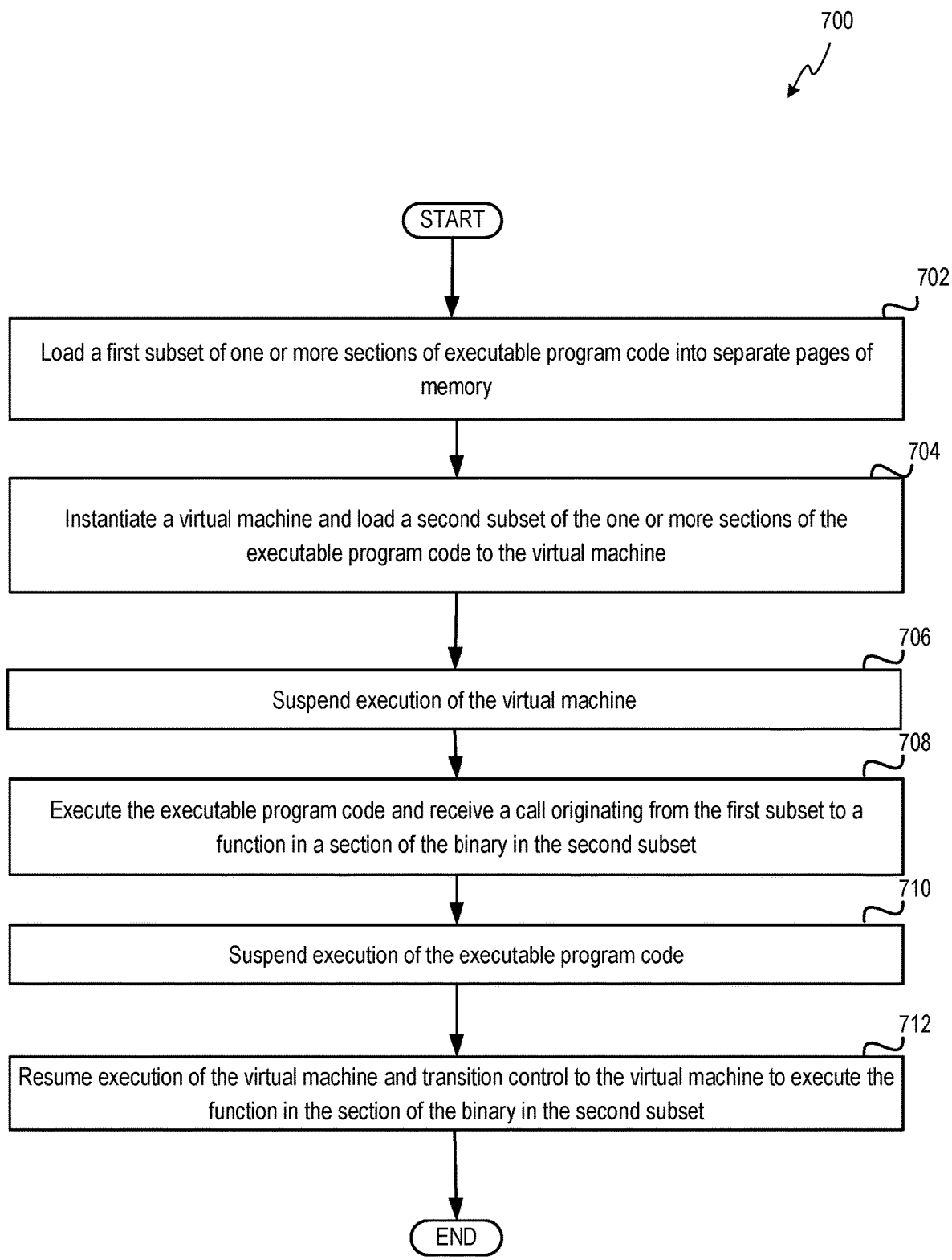
FIG. 7 depicts a flow diagram of an example method for using a virtual machine to execute certain sections of executable program code, in accordance with one or more aspects of the present disclosure.

FIG. 7 depicts a flow diagram of an example method 700 for using a virtual machine 170 to execute certain sections of executable program code, in accordance with one or more aspects of the present disclosure. Method 700 includes operations performed by the host OS 120. Also, method 700 may be performed in the same or a similar manner as described above in regards to method 300. Method 700 may be performed by processing devices of the host computer system 100.

At block 702, the processing device may load a first subset of one or more sections of executable program code 132 into separate pages 162 of memory. The one or more sections of the executable program code 132 may implement an executable program 130. The compiler 140 may have organized the sections of the executable program code 132, as discussed above. Each section may be associated with a label (e.g., section name).

At block 704, the processing device may instantiate a virtual machine 170 and load a second subset of the one or more sections of the executable program code 132 to the virtual machine 170. The second subset of the sections may include sections that are identified as susceptible to exploitation or are otherwise good candidates for isolation. In some embodiments, the virtual machine 170 may just be loaded with the second subset of the sections and may not include any other code loaded (e.g., no kernel code, no other executable code). For example, a virtual machine entry instruction may be executed to enter the virtual machine 170, the virtual machine 170 may be assigned an identifier and a portion of memory, and the second subset may be loaded to the virtual machine 170. Further, the virtual machine 170 may not be allowed to access the file system of the host OS 120, to have network access, or the like. In other embodiments, the virtual machine 170 may include minimal kernel code that includes a soft fault handler 152 to be able to perform the techniques described herein relating to handling page faults, checking a transition table 134 to determine whether transitions between labels are allowed, modifying permissions of pages including sections if the transitions are allowed, etc. In some embodiments, a separate virtual machine 170 may be allocated and instantiated for each section of code identified as being a good candidate for isolation in view of the annotations in the executable program code 132.

At block 706, the processing device may suspend execution of the virtual machine 170. For example, the processing device may execute a virtual machine exit instruction that suspends the execution of the virtual machine and transfer control to the host OS 120.

At block 708, the processing device may execute the executable program code 132 and receive a call originating from the first subset of sections to a function in a section of the executable program code in the second subset on the virtual machine 170.

At block 710, the processing device suspend execution of the executable program 130. At block 712, the processing device may resume execution of the virtual machine 170 and transition control to the virtual machine to execute the function in the section of the executable program code 132 in the second subset. For example, the processing device may execute a virtual machine entry instruction to resume execution of the virtual machine 170 and transfer control to the virtual machine 170. The return from the executable program code executed on the virtual machine 170 may include copying any data out to the calling function in the executable program 130 operating on the host OS 120 and suspending execution of the virtual machine 170 (e.g., executing a virtual machine exit instruction).

Figure 8:
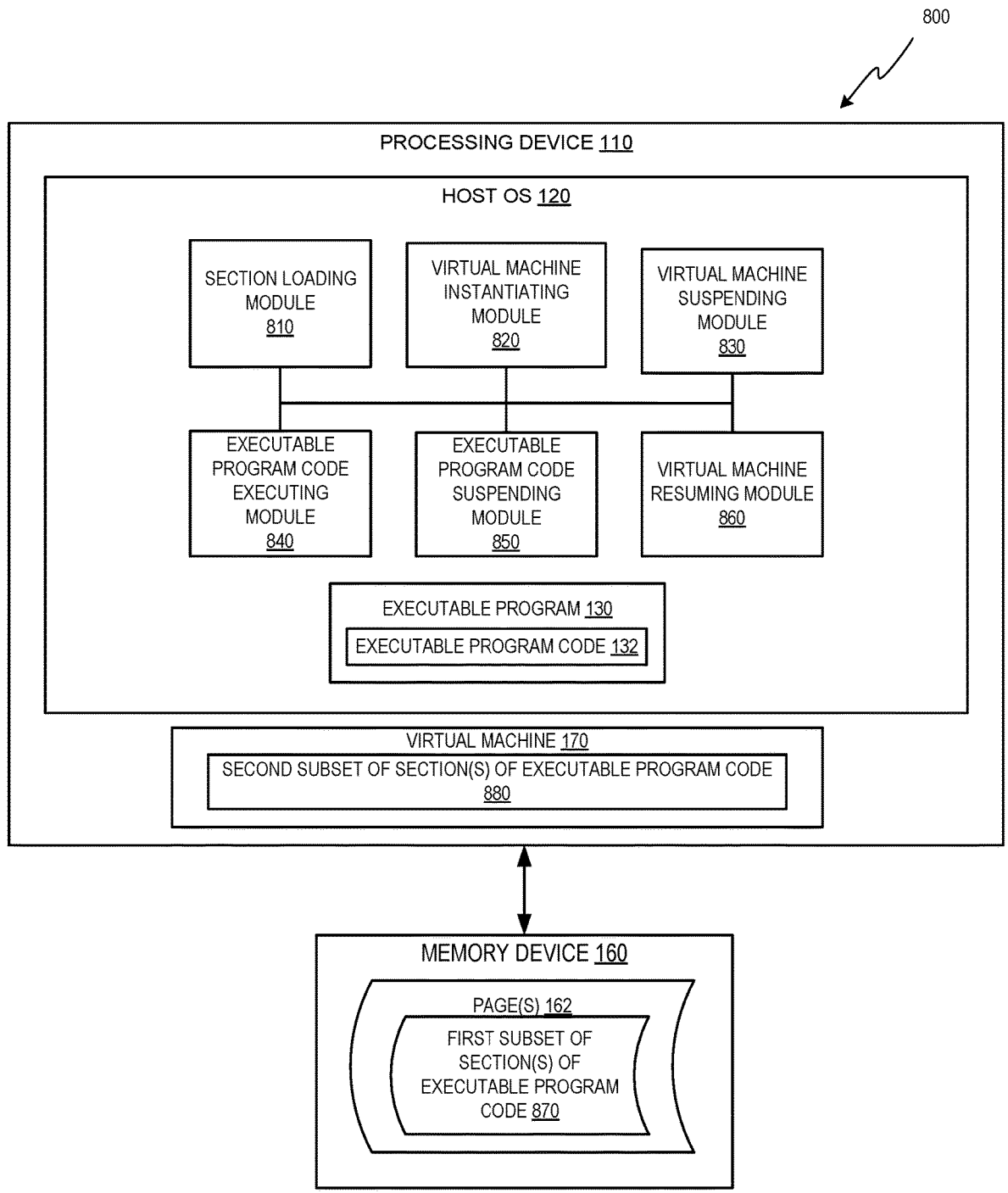
FIG. 8 depicts a block diagram of an example computer system for performing the method of FIG. 7, in accordance with one or more aspects of the present disclosure.

FIG. 8 depicts a block diagram of an example computer system 800 for performing the method 700 of FIG. 7, in accordance with one or more aspects of the present disclosure. Computer system 800 may be the same or similar to the host computer system 100 and may include one or more processing devices 110 coupled to one or more memory devices 160. In the example shown, computer system 800 may include section loading module 810, virtual machine instantiating module 820, virtual machine suspending module 830, executable program code executing module 840, executable program code suspending module 850, and virtual machine resuming module 860.

Section loading module 810 may include loading a first subset 870 of one or more sections of the executable program code 132 into separate pages of the memory device 160. The one or more sections may implement an executable program 130.

Virtual machine instantiating module 820 may instantiate a virtual machine and load a second subset 880 of the one or more sections of the executable program code 132 to the virtual machine 170. The second subset 880 of sections may include section identified as being good candidates for isolation. Further, the virtual machine 170 may be instantiated and loaded with the second subset 880 when the first subset 870 is loaded to memory.

Virtual machine suspending module 830 may suspend execution of the virtual machine 170. The execution of the virtual machine 170 may be suspended by executing a virtual machine exit instruction.

Executable program code executing module 840 may execute the executable program 130 on the host OS 120. Further, during execution of the executable program 130, a call originating from a section of the first subset 870 of the sections to a function in a section in the second subset 880 may be received.

Responsive to the function call, executable program code suspending module 850 may suspend execution of the executable program 130. Further, virtual machine resuming module 860 may resume execution of the virtual machine 170 and transition control to the virtual machine 170 to execute the function in the section of the executable program code 132 in the second subset 880 of sections on the virtual machine 170. Such a technique may isolate any malicious attempt to corrupt data and/or gain access to improper parts of the executable program 130 by the second subset 880 executing on the virtual machine 170.

Figure 9:
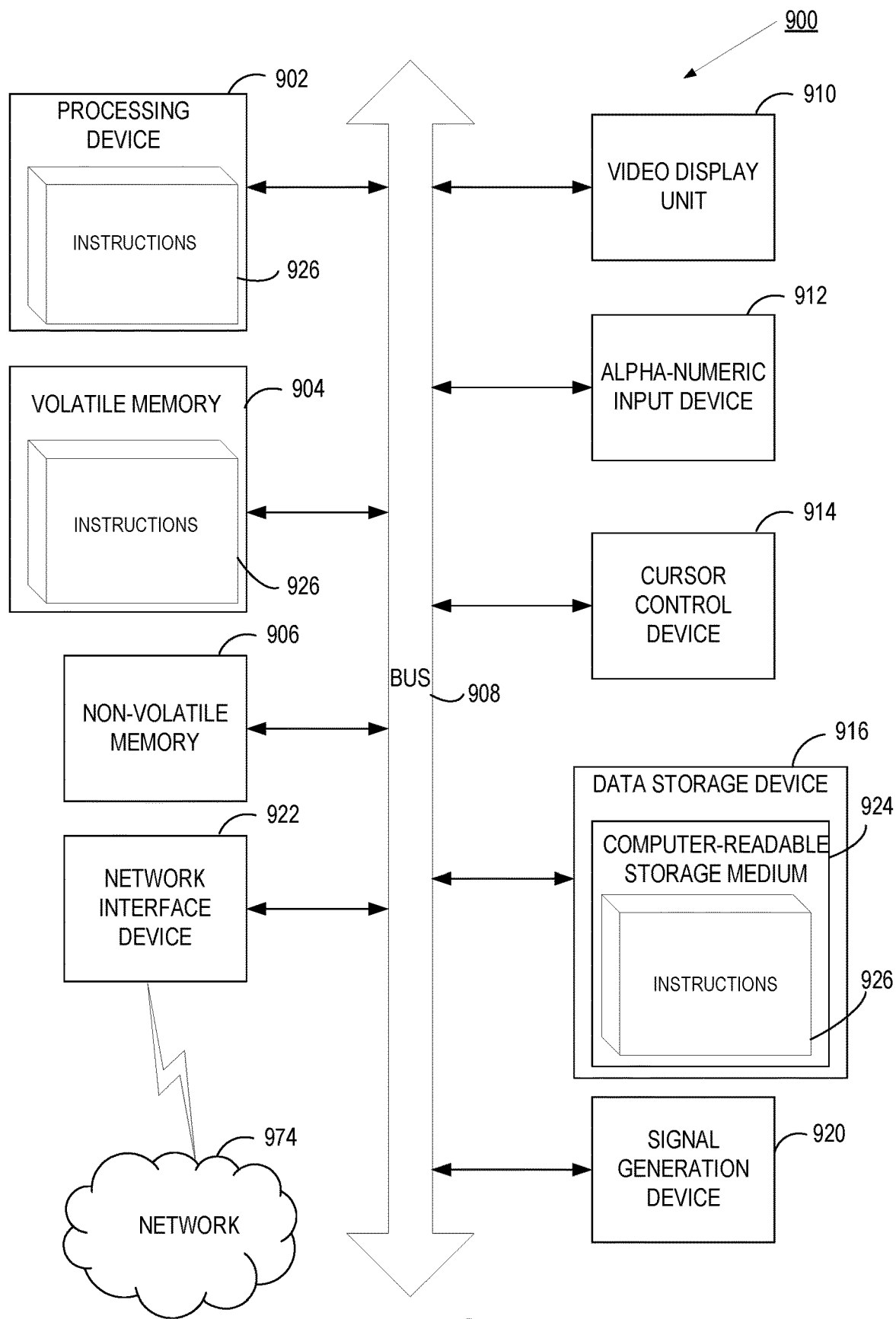
FIG. 9 depicts a block diagram of an illustrative computing device operating in accordance with the examples of the present disclosure.

FIG. 9 depicts a block diagram of an illustrative computing device operating in accordance with the examples of the present disclosure. In various illustrative examples, computer system 900 may correspond to a computing device similar to host computer system 100 of FIG. 1. In one implementation, the computer system 900 may be the host computer system 100. The computer system 900 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alpha-numeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions implementing host operating system 120 of FIG. 1 for implementing the methods described herein.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform the methods described herein, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: loading each of a plurality of sections of an executable program code into a respective page of memory of a plurality of pages of memory; configuring one or more permissions for a first page of the memory including a first section of the executable program code to enable execution of the first section of the executable program code loaded into the first page, the first section associated with a first label; configuring one or more permissions for a second page of the memory including a second section of the executable program code to disable execution of the second section of the executable program code loaded into the second page, the second section associated with a second label; and responsive to a determination that a transition from the first section to the second section is allowed during execution of the executable program code, changing the one or more permissions of the second page to enable execution of the second section of the executable program code.

Example 2 is the method of Example 1, further comprising: identifying, using one or more annotations in the executable program code, one or more sections of the plurality of sections of the executable program code that are allowed to transition to one another; or identifying, using the one or more annotations, the one or more sections of the plurality of sections of the executable program code that are not allowed to transition to one another.

Example 3 is the method of Example 2, further comprising: associating a plurality of labels to the plurality of sections of the executable program code; and maintaining a transition table that specifies allowed transitions between the plurality of labels associated with the plurality of sections in view of the one or more annotations.

Example 4 is the method of Example 1, further comprising using the transition table to determine whether the transition from the first section to the second section is allowed during execution of the executable program code.

Example 5 is the method of Example 1, responsive to the determination that the transition from the first section to the second section is allowed during execution of the executable program code, changing the one or more permissions of the first page to disable execution of the first section of the executable program code.

Example 6 is the method of Example 1, wherein, at any time, a single page of the plurality of pages of memory is configured with permissions that enable execution of a section of the plurality of sections of the executable program code loaded to the single page and remaining pages of the plurality of pages are configured with permissions that disable execution of remaining sections of the plurality of sections of the executable program code loaded to the remaining pages.

Example 7 is the method of Example 1, further comprising: receiving a page fault in response to an attempt to execute the transition; and using a transition table to determine whether the transition from the first section to the second section is allowed, wherein the transition table comprises at least one mapping of an allowable transition from the first label associated with the first section to the second label associated with the second section.

Example 8 is the method of Example 1, further comprising, responsive to a determination that the transition from the first section to the second section is not allowed, terminating execution of the executable program code.

Example 9 is the method of Example 1, further comprising, responsive to a determination that the transition from the first section to the second section is not allowed: suspend execution of the executable program code; clone the executable program code to a virtual machine operating as a sandbox; and transfer control to the virtual machine to execute the executable program code to carry out the transition.

Example 10 is the method of Example 9, wherein the virtual machine is loaded with just the second section of the executable program code.

Example 11 is the method of Example 1, wherein the determination that the transition from the first section to the second section is allowed during execution of the executable program code is made using a transition table comprising at least one mapping of an allowable transition from the first label associated with the first section to the second label associated with the second section.

Example 12 is a method comprising: maintaining a transition table that specifies allowed transitions between a plurality of labels associated with a plurality of sections of an executable program code; determining whether a transition is allowed from a first label associated with a first section of the plurality of sections of the executable program code to a second label associated with a second section of the plurality of sections of the executable program code in view of the transition table; and responsive to a determination that the transition from the first label to the second label is allowed, changing one or more permissions of a first page of memory including the first section to disable execution of the first section and changing one or more permissions of a second page of memory including the second section to enable execution of the second section.

Example 13 is the method of Example 12, further comprising: executing the second section; receiving a page fault in response to an attempt to transition from the second section to the first section during execution of the second section; determining whether the transition is allowed from the second label associated with the second section to the first label associated with the first section; and responsive to a determination that the transition from the second label to the first label is allowed, changing the one or more permissions of the second page including the second section to disable execution of the second section and changing the one or more permissions of the first page including the first section to enable execution of the first section.

Example 14 is the method of Example 12, further comprising receiving a page fault in response to an attempt to execute the transition.

Example 15 is the method of Example 12, further comprising, responsive to a determination that the transition from the first label to the second label is not allowed, terminating execution of the executable program code.

Example 16 is the method of Example 12, further comprising, responsive to a determination that the transition from the first label to the second label is not allowed: suspending execution of the executable program code; cloning the executable program code to a virtual machine operating as a sandbox; and transferring control to the virtual machine to execute the executable program code to carry out the transition.

Example 17 is the method of Example 12, further comprising: identifying, using one or more annotations in the executable program code, one or more sections of the plurality of sections of the executable program code that are allowed to transition to one another; associating the plurality of labels to the plurality of sections of the executable program code; and creating the transition table in view of the one or more annotations.

Example 18 is a system comprising: a memory device storing instructions; and a processing device coupled to the memory device, wherein the processing device executes the instructions to: load a first subset of one or more sections of executable program code into separate pages of memory, wherein the one or more sections of the executable program code implement an executable program; instantiate a virtual machine and load a second subset of the one or more sections of the executable program code to the virtual machine; suspend execution of the virtual machine; execute the executable program and receive a call originating from the first subset to a function in a section of the executable program code in the second subset; suspend execution of the executable program; and resume execution of the virtual machine and transition control to the virtual machine to execute the function in the section of the executable program code in the second subset.

Example 19 is the system of Example 18, wherein the virtual machine exclusively executes the second subset of the one or more sections of the executable program code and does not execute any other code.

Example 20 is the system of Example 18, wherein: the virtual machine includes a transition table comprising mappings that specify allowable transitions between a first plurality of labels associated with a portion of the second subset of the one or more sections of the executable program code and a second plurality of labels associated with a second portion of the second subset of the one or more sections of the executable program code; and the virtual machine uses the transition table to determine whether transitions between sections of the second subset are allowed.

Example 21 is a non-transitory, computer-readable medium storing instructions that, when executed, cause a processing device to: execute an executable program comprising a plurality of sections of executable program code; determine whether a transition is allowed from a first label associated with a first section of the plurality of sections of the executable program code to a second label associated with a second section of the plurality of sections of the executable program code; responsive to a determination that the transition is not allowed: suspend execution of the executable program; clone the executable program to a virtual machine operating as a sandbox; and transfer control to the virtual machine to execute the executable program to carry out the transition.

Example 22 is the computer-readable medium of Example 21, wherein cloning the executable program comprises the processing device further to copy just the second section of the executable program code to the virtual machine, wherein the virtual machine exclusively executes the second section of the executable program code and the virtual machine does not execute any other code.

Example 23 is the computer-readable medium of Example 21, wherein cloning the executable program comprises the processing device further to copy a virtual address space of the executable program to the virtual machine.

Example 24 is the computer-readable medium of Example 21, wherein the processing device is further to: identify, using one or more annotations in the executable program code, one or more sections of the plurality of sections of the executable program code that are allowed to transition to one another; associating the plurality of labels to the plurality of sections of the executable program code; and creating a transition table in view of the one or more annotations, wherein the transition table comprises mappings of allowable transitions from a first set of the plurality of labels associated with a first set of the sections of the plurality of sections to a second set of the plurality of labels associated with a second set of the sections of the plurality of sections.

Example 25 is the computer-readable medium of Example 21, wherein the processing device is further to use the transition table to determine whether the transition is allowed from the first label associated with the first section to the second label associated with the second section.

Example 26 is an apparatus comprising: means for loading each of a plurality of sections of an executable program code into a respective page of memory of a plurality of pages of memory; means for configuring one or more permissions for a first page of the memory including a first section of the executable program code to enable execution of the first section of the executable program code loaded into the first page, the first section associated with a first label; means for configuring one or more permissions for a second page of the memory including a second section of the executable program code to disable execution of the second section of the executable program code loaded into the second page, the second section associated with a second label; and responsive to a determination that a transition from the first section to the second section is allowed during execution of the executable program code, means for changing the one or more permissions of the second page to enable execution of the second section of the executable program code.

Example 27 is the apparatus of Example 26, further comprising: means for identifying, using one or more annotations in the executable program code, one or more sections of the plurality of sections of the executable program code that are allowed to transition to one another; or means for identifying, using the one or more annotations, the one or more sections of the plurality of sections of the executable program code that are not allowed to transition to one another.

Example 28 is the apparatus of Example 27, further comprising: means for associating a plurality of labels to the plurality of sections of the executable program code; and means for maintaining a transition table that specifies allowed transitions between the plurality of labels associated with the plurality of sections in view of the one or more annotations.

Example 29 is the apparatus of Example 28, further comprising means for using the transition table to determine whether the transition from the first section to the second section is allowed during execution of the executable program code.

Example 30 is the apparatus of Example 26, further comprising, responsive to the determination that the transition from the first section to the second section is allowed during execution of the executable program code, means for changing the one or more permissions of the first page to disable execution of the first section of the executable program code.

Example 31 is the apparatus of Example 26, further comprising: means for receiving a page fault in response to an attempt to execute the transition; and means for using a transition table to determine whether the transition from the first section to the second section is allowed, wherein the transition table comprises at least one mapping of an allowable transition from the first label associated with the first section to the second label associated with the second section.

Example 32 is the apparatus of Example 26, further comprising, responsive to a determination that the transition from the first section to the second section is not allowed, means for terminating execution of the executable program code.

Example 33 is the apparatus of Example 26, further comprising, responsive to a determination that the transition from the first section to the second section is not allowed: means for suspending execution of the executable program code; means for cloning the executable program code to a virtual machine operating as a sandbox; and means for transferring control to the virtual machine to execute the executable program code to carry out the transition.

What is claimed is:

1. A method comprising:
    configuring one or more permissions for a first page of memory including a first section of a plurality of sections of an executable program code to enable execution of the first section of the executable program code;
    configuring one or more permissions for a second page of the memory including a second section of the executable program code to disable execution of the second section of the executable program code;
    identifying one or more annotations in the executable program code, wherein the one or more annotations indicate one or more allowed transitions and one or more disallowed transitions between the plurality of sections;
    determining, in view of the one or more annotations, that a transition from a first label associated with the first section to a second label associated with the second section is not allowed; and
    transferring control to a virtual machine operating as a sandbox to execute the executable program code to carry out the transition, wherein the virtual machine is not loaded with the first section of the executable program code, and wherein the virtual machine is loaded with the second section of the executable program code for execution.

2. The method of claim 1, further comprising:
    loading each of the plurality of sections of the executable program code into a respective page of a plurality of pages of the memory, wherein the first section of the executable program code is loaded into the first page, and wherein the second section of the executable program code is loaded into the second page.

3. The method of claim 1, further comprising:
    identifying, using the one or more annotations in the executable program code, one or more sections of the plurality of sections of the executable program code that are allowed to transition to one another; or
    identifying, using the one or more annotations, the one or more sections of the plurality of sections of the executable program code that are not allowed to transition to one another.

4. The method of claim 1, further comprising:
    associating a plurality of labels to the plurality of sections of the executable program code, wherein the first section is associated with the first label of the plurality of labels and the second section is associated with the second label of the plurality of labels; and
    maintaining a transition table that specifies allowed transitions between the plurality of labels associated with the plurality of sections in view of the one or more annotations.

5. The method of claim 4, further comprising using the transition table to determine whether the transition from the first section to the second section is allowed during execution of the executable program code.

6. The method of claim 1, further comprising;
    responsive to determining that the transition from the first label associated with the first section to the second label associated with the second section is allowed, changing the one or more permissions of the second page to enable execution of the second section of the executable program code, wherein changing the one or more permissions of the second page to enable execution of the second section of the executable program code comprises:
        determining, using the one or more annotations, whether a transition from the first section with enabled execution to the second section with disabled execution is allowed during execution of the executable program code; and
        responsive to a determination that the transition from the first section to the second section is allowed during execution of the executable program code, changing the one or more permissions of the second page to enable execution of the second section of the executable program code.

7. The method of claim 1, further comprising:
    receiving a page fault in response to an attempt to execute a transition from the first section to the second section; and
    using a transition table to determine whether the transition from the first section to the second section is allowed, wherein the transition table comprises at least one mapping of an allowable transition from the first label associated with the first section to the second label associated with the second section.

8. The method of claim 1, further comprising, responsive to a determination that a transition from the first section to the second section is not allowed, terminating execution of the executable program code.

9. The method of claim 1, further comprising, responsive to the determination that the transition from the first section to the second section is not allowed:
    suspending execution of the executable program code; and cloning the executable program code to the virtual machine operating as the sandbox.

10. The method of claim 1, further comprising:
determining that a transition from the first section to the second section is allowed during execution of the executable program code, wherein the determination is made using a transition table comprising at least one mapping of an allowable transition from the first label associated with the first section to the second label associated with the second section.

11. A non-transitory computer-readable medium comprising instructions that, when executed by a processing device, cause the processing device to:
configure one or more permissions for a first page of memory including a first section of a plurality of sections of an executable program code to enable execution of the first section of the executable program code;
configure one or more permissions for a second page of the memory including a second section of the executable program code to disable execution of the second section of the executable program code;
identify one or more annotations in the executable program code, wherein the one or more annotations indicate one or more allowed transitions and one or more disallowed transitions between the plurality of sections;
determine, in view of the one or more annotations, that a transition from a first label associated with the first section to a second label associated with the second section is not allowed; and
transferring control to a virtual machine operating as a sandbox to execute the executable program code to carry out the transition, wherein the virtual machine is not loaded with the first section of the executable program code, and wherein the virtual machine is loaded with the second section of the executable program code for execution.

12. The non-transitory computer-readable medium of claim 11, further comprising instructions that, when executed by the processing device, cause the processing device to:
load each of the plurality of sections of the executable program code into a respective page of a plurality of pages of the memory, wherein the first section of the executable program code is loaded into the first page, and wherein the second section of the executable program code is loaded into the second page.

13. The non-transitory computer-readable medium of claim 11, further comprising instructions that, when executed by the processing device, cause the processing device to:
identify, using the one or more annotations in the executable program code, one or more sections of the plurality of sections of the executable program code that are allowed to transition to one another; or
identify, using the one or more annotations, the one or more sections of the plurality of sections of the executable program code that are not allowed to transition to one another.

14. The non-transitory computer-readable medium of claim 11, further comprising instructions that, when executed by the processing device, cause the processing device to:
associate a plurality of labels to the plurality of sections of the executable program code, wherein the first section is associated with the first label of the plurality of labels and the second section is associated with the second label of the plurality of labels; and
maintain a transition table that specifies allowed transitions between the plurality of labels associated with the plurality of sections in view of the one or more annotations.

15. The non-transitory computer-readable medium of claim 14, further comprising instructions that, when executed by the processing device, cause the processing device to use the transition table to determine whether the transition from the first section to the second section is allowed during execution of the executable program code.

16. The non-transitory computer-readable medium of claim 11, further comprising instructions that, when executed by the processing device, cause the processing device to:
determine, using the one or more annotations, whether a transition from the first section with enabled execution to the second section with disabled execution is allowed during execution of the executable program code; and
responsive to a determination that the transition from the first section to the second section is allowed during execution of the executable program code, change the one or more permissions of the second page to enable execution of the second section of the executable program code.

17. A system comprising:
a memory device storing instructions; and
a processing device coupled to the memory device, wherein the processing device executes the instructions to:
configure one or more permissions for a first page of memory including a first section of a plurality of sections of an executable program code to enable execution of the first section of the executable program code;
configure one or more permissions for a second page of the memory including a second section of the executable program code to disable execution of the second section of the executable program code;
identify one or more annotations in the executable program code, wherein the one or more annotations indicate one or more allowed transitions and one or more disallowed transitions between the plurality of sections;
determine, in view of the one or more annotations, that a transition from a first label associated with the first section to a second label associated with the second section is not allowed; and
transferring control to a virtual machine operating as a sandbox to execute the executable program code to carry out the transition, wherein the virtual machine is not loaded with the first section of the executable program code, and wherein the virtual machine is loaded with the second section of the executable program code for execution code.

18. The system of claim 17, wherein the processing device is further to:
load each of the plurality of sections of the executable program code into a respective page of a plurality of pages of the memory, wherein the first section of the executable program code is loaded into the first page, and wherein the second section of the executable program code is loaded into the second page.

19. The system of claim 17, wherein the processing device is further to:
responsive to determining that the transition from the first label associated with the first section to the second label associated with the second section is allowed, changing the one or more permissions of the second page to enable execution of the second section of the executable program code, wherein to change the one or more permissions of the second page to enable execution of the second section of the executable program code, the processing device is further to:
determine, using the one or more annotations, whether a transition from the first section with enabled execution to the second section with disabled execution is allowed during execution of the executable program code; and
responsive to a determination that the transition from the first section to the second section is allowed during execution of the executable program code, change the one or more permissions of the second page to enable execution of the second section of the executable program code.

\* \* \* \* \*